US007487284B2

(12) United States Patent
Kapur et al.

(10) Patent No.: US 7,487,284 B2
(45) Date of Patent: Feb. 3, 2009

(54) TRANSACTION FLOW AND ORDERING FOR A PACKET PROCESSING ENGINE, LOCATED WITHIN AN INPUT-OUTPUT HUB

(75) Inventors: Suvansh Krishan Kapur, Portland, OR (US); Ali S. Oztaskin, Beaverton, OR (US); Raman Nayyar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 11/495,069

(22) Filed: Jul. 28, 2006

(65) Prior Publication Data

US 2008/0025289 A1    Jan. 31, 2008

(51) Int. Cl.
    *G06F 13/00* (2006.01)
(52) U.S. Cl. .................. 710/310; 710/313; 710/316; 370/351
(58) Field of Classification Search ............... 710/306, 710/310, 313, 316; 370/351
    See application file for complete search history.

(56) References Cited

U.S. PATENT DOCUMENTS

| | | | |
|---|---|---|---|
| 5,522,050 A | 5/1996 | Amini et al. | |
| 5,948,081 A | 9/1999 | Foster | |
| 6,823,405 B1 | 11/2004 | Askar | |
| 7,298,746 B1 * | 11/2007 | De La Iglesia et al. | 370/394 |
| 2004/0151177 A1 | 8/2004 | Burton et al. | |
| 2004/0260891 A1 | 12/2004 | Jeddeloh et al. | |
| 2005/0228930 A1 * | 10/2005 | Ning et al. | 710/306 |
| 2006/0047903 A1 | 3/2006 | Passerini | |
| 2006/0251096 A1 * | 11/2006 | Metsker | 370/422 |
| 2007/0086480 A1 * | 4/2007 | Elzur | 370/463 |
| 2007/0156980 A1 | 7/2007 | Nayyar et al. | |
| 2007/0186060 A1 * | 8/2007 | Nayyar et al. | 711/154 |

\* cited by examiner

*Primary Examiner*—Glenn A Auve
(74) *Attorney, Agent, or Firm*—Blakely, Sokoloff, Taylor & Zafman LLP

(57) ABSTRACT

An apparatus and method for controlling data traffic flow and data ordering of packet data between one or more peripheral devices and a processor/memory combination by using a packet processing engine, located within an input-output hub (IOH). The IOH may include a packet processing engine, and a switch to route packet data between the one or more peripheral devices and the packet processing engine. The packet processing engine of the IOH may control data traffic flow and data ordering of the packet data to and from the one or more peripheral devices through the switch and also maintains flow and ordering to the processor/memory subsystem. The packet processing engine may be operable to perform packet processing operations, such as virtualization of a peripheral device or Transmission Control Protocol/Internet Protocol (TCP/IP) offload.

24 Claims, 14 Drawing Sheets

TRANSACTION FLOW AND ORDERING FOR A PACKET PROCESSING ENGINE, LOCATED WITHIN AN INPUT-OUTPUT HUB

TECHNICAL FIELD

This invention relates to the field of electronic computing devices and, in particular, to chipsets of electronic computing devices.

BACKGROUND

One conventional method for performing packet processing and/or virtualization is done in a peripheral device that is external to a processor and/or a chipset, such as in a network interface card. For example, the network interface card may include an offload engine to perform Transmission Control Protocol/Internet Protocol (TCP/IP) processing (e.g., TCP/IP Offload Engine (TOE)) on packets received from and transmitted to a network. A TOE may be a network adapter, which performs some or all of the TCP/IP processing on the network interface card (e.g., Ethernet adapter) instead of on the central processing unit (CPU). Offloading the processing from the CPU to the card allows the CPU to keep up with the high-speed data transmission. Processing for the entire TCP/IP protocol stack may be performed on the TOE or can be shared with the CPU.

TCP/IP is a communications protocol developed under contract from the U.S. Department of Defense to internetwork dissimilar systems and is the protocol of the Internet and the global standard for communications. TCP/IP is a routable protocol, and the IP "network" layer in TCP/IP provides this capability. The header prefixed to an IP packet may contain not only source and destination addresses of the hosts, but source and destination addresses of the networks in which they reside. Data transmitted using TCP/IP can be sent to multiple networks within an organization or around the globe via the Internet, the world's largest TCP/IP network.

BRIEF DESCRIPTION OF THE DRAWINGS

The present invention is illustrated by way of example, and not by way of limitation, in the figures of the accompanying drawings.

DETAILED DESCRIPTION

Figure 1:
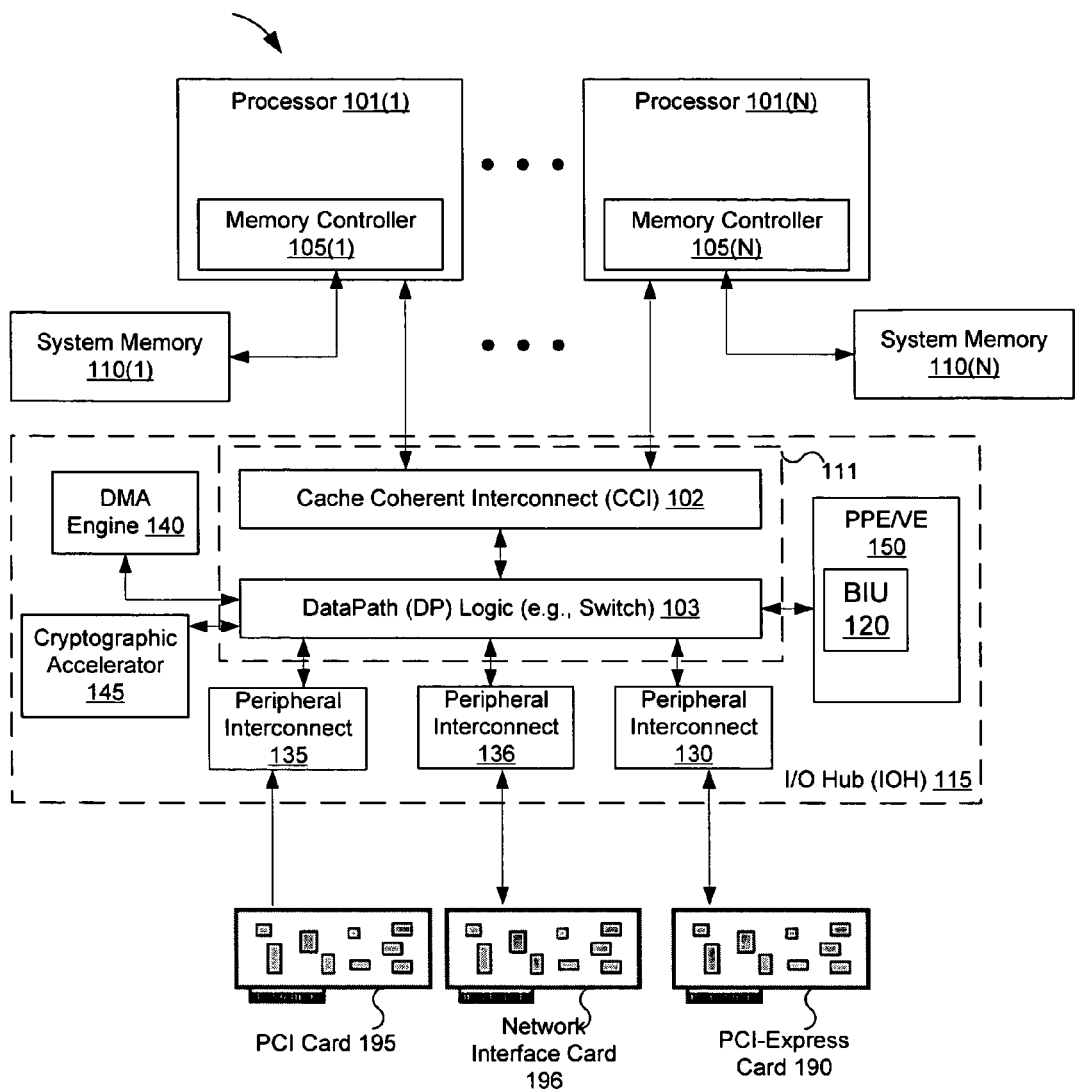
FIG. 1 illustrates a block diagram of one embodiment of an electronic system, including a packet processing/virtualization engine, located within an input-output hub (IOH).

Described herein is an apparatus and method for controlling data traffic flow and data ordering of packet data between one or more peripheral devices and a packet processing engine, and between the packet processing engine and a central processing unit, located within an input-output hub (IOH). The IOH may include a packet processing engine, and a switch to route packet data between the one or more peripheral devices and the packet processing engine. The packet processing engine of the IOH may control data traffic flow and data ordering of the packet data to and from the one or more peripheral devices through the switch. The packet processing engine may be operable to perform packet processing operations, such as virtualization of a peripheral device or Transmission Control Protocol/Internet Protocol (TCP/IP) offload. The embodiments of traffic flow and ordering described herein are described with respect to and based upon PCI EXPRESS® (PCI-E) based traffic. Alternatively, other types of traffic may be used.

Described herein is a description of data transactions, such as send and receive operations, of the packet processing engine/virtualization engine (PPE/VE). The PPE/VE and its firmware may be operative to provide packet processing for technologies such as Virtualization of I/O Device or for TCP/IP Offload. The receive operation (e.g., receive transaction) may include receiving a data packet from an IO device (e.g., peripheral device), storing the data packet in packet buffers, determining a context for the data packet, using Receive Threads, or other threads. Once the destination is determined then the PPE/VE uses its direct memory access (DMA) engine to send the data packet to system memory. Subsequently, the PPE/VE notifies the application or virtual machine monitor (VMM) of the receive transaction.

The PPE/VE may also be programmed to transmit data. The transmit operation (e.g., transmit transaction) may include receiving a request for a transmit transaction from either an application or VMM. This may be done by ringing a doorbell in a Doorbell target of the PPE/VE. Next, the PPE/VE may communicate the request to the I/O device, such as by storing descriptor rings in the packet buffers. Subsequently, the data packet of the transmit transaction may be sent to the IO device. This may be done by the PPE/VE receiving the data packet into its packet buffer, and sending the data packet from its packet buffer to the IO device. Alternatively, the PPE/VE may let the I/O device transfer (e.g., via DMA engine) the data packet directly from system memory into its own packet buffer. When the data packet is consumed from system memory, the PPE/VE will communicate the consumption back to the application or VMM, notifying of the completion of the transmit transaction.

The embodiments described herein address the ordering rules and flow behavior at two levels. At one level it describes the constraints of the flow between the PPE/VE, peripheral device, and the processor. There may be four channels of communication between the PPE/VE and the datapath logic (e.g., switch). It also presents alternatives of how the channels can be used to provide correct functionality and performance.

At another level it describes the constraints on the flow of transactions within the PPE/VE, as the different hardware assists work in concert to perform receive and send operations. Thus, it describes the flow of transactions from the microengine (ME) to the BIU and from the BIU to the targets of the PPE/VE.

The ideas and operations of embodiments of the invention will be described primarily with reference to a chipset to interface between the memory of a computer system and one or more peripheral devices. "Chipset" is a collective noun that refers to a circuit or group of circuits to perform functions of use to a computer system. Embodiments of the invention may be incorporated within a single microelectronic circuit or integrated circuit ("IC"), a portion of a larger circuit, or a group of circuits connected together so that they can interact as appropriate to accomplish the function. Alternatively, functions that may be combined to implement an embodiment of the invention may be distributed among two or more separate circuits that communicate over interconnecting paths. However, it is recognized that the operations described herein can also be performed by software, or by a combination of hardware and software, to obtain similar benefits.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

FIG. 1 illustrates a block diagram of one embodiment of an electronic system, including a packet processing/virtualization engine, located within an input-output hub (IOH). Electronic system 100 includes processor 101(1) (e.g., central processing unit (CPU)), system memory 110, IOH 115, and one or more peripheral devices 104 (e.g., 195, 196, 190). Processor 101 may include a memory controller 105(1). One of the functions of memory controller 105 is to manage other modules' interactions with system memory 110 and to ensure that the cache's contents are reliably coherent with memory. The storage for the cache itself may be elsewhere (for example, within processor 101), and the memory controller may monitor modules' interactions and produce signals to invalidate certain cache entries when the underlying memory contents have changed.

Electronic system 100 may also include multiple processors, processors 101(1)-101(N), where N is the number of processors. Each processor may include a memory controller, memory controllers 105(1)-105(N), and each may be coupled to a corresponding system memory 110(1)-110(N). The embodiments described herein will be described as being coupled to one processor and one system memory for ease of discussion, but is not limited to being coupled to one processor, and one system memory.

The IOH 115 may include a cache coherent interconnect (CCI) port 102 connected to the processor 101, one or more peripheral interconnects (e.g., 135, 136, and 130), datapath (DP) logic 102 (e.g., switch) to route transactions between the processor 101, I/O devices 104 (e.g., 195, 196, 190) and any internal agents (e.g., 140, 145, 150). The PPE/VE 150 may be coupled to one of the switch ports of switch 103. The packet processing engine 150 may also act as a Virtualization Engine (VE). The VE may be operable to produce an appearance of a plurality of virtual devices, much like a peripheral device. The VE in turn maps the transactions between the virtual devices to the real peripheral devices. Ordering logic of the VE may be operable to maintain an order in which memory transactions associated with one virtual device are executed.

Element 115 is an input-output hub (IOH) to communicate with memory controller 105. IOH 115 may include a bus interface unit (BIU) 111 or local bus controller. The BIU 111 of IOH 115 may include CCI 102, and DP logic 103. The BIU 111 may consolidate operations from several of the modules located "below" it, e.g., peripheral interconnects 130, 135, and 136, DMA engine 140 and PPE/VE 150. These modules, or "targets," perform various functions that may be of use in the overall system's operation, and—as part of those functions—may need to write data to system memory 110. The functions of some of the targets mentioned will be described so that their relationship with the methods and structures of embodiments of the invention can be understood, but those of skill in the relevant arts will recognize that other targets to provide different functions and interfaces can also benefit from the procedures disclosed herein. One could extend the concepts and methods of embodiments of the invention to targets not shown in this figure.

In one embodiment, BIU 111 may include a cache coherent interconnect (CCI) 102, and datapath (DP) logic 103, such as a switch. Alternatively, BIU 111 may include other logic for interfacing the processor 101, and memory 110 with the components of the IOH 115.

IOH 115 may include other elements not shown in FIG. 1, such as data storage to hold data temporarily for one of the other modules, work queues to hold packets describing work to be done for the modules, and micro-engines to perform sub-tasks related to the work.

Described herein is an apparatus and method for controlling data traffic flow and data ordering Peripheral interconnects 130, 135, and 136 provide signals and implement protocols for interacting with hardware peripheral devices such as, for example, a network interface card (NIC) 196, a mass storage interface card, or a graphics adapter (e.g., video card). The hardware devices need not be restricted to network/storage/video cards. Also, the peripheral interconnects may be other types of signaling units used to communicate with IO devices. The peripheral interconnects 135, 136, 130 may implement one side of an industry-standard interface, such as Peripheral Component Interconnect (PCI) interface, PCI EXPRESS® interface, or Accelerated Graphics Port (AGP) interface. Hardware devices that implement a corresponding interface can be connected to the appropriate signaling unit (e.g., peripheral interconnect), without regard to the specific function to be performed by the device. The industry-standard interface protocols may be different from those expected or required by other parts of the system, so part of the duties of peripheral interconnects 130, 135, and 136 may be to "translate" between the protocols. For example, NIC 196 may receive a data packet from a network communication peer that it is to place in system memory 110 for further processing. Peripheral interconnect 136 may have to engage in a protocol with memory controller 105, perhaps mediated by IOH 115, to complete or facilitate the transfer to system memory 110. Note that the function(s) provided by the hardware devices may not affect the ordering optimizations that can be achieved by embodiments of the invention. That is, the ordering may be modified based on the promises and requirements of the interface (e.g., PCI interface, or PCI EXPRESS® interface) and not based on the type of connected device (e.g. NIC, storage interface, or graphics adapter).

DMA engine 140 may be a programmable subsystem that can transfer data from one place in the system to another. It may provide a different interface (or set of promises) to its clients than other modules that transfer data from place to place, and may be useful because its transfers are faster or provide some other guarantees that a client needs. For example, DMA engine 140 may be used to copy blocks of data from one area of memory 110 to another area, or to move data between memory 110 and one of the other modules in I/O hub 115.

Packet processing engine/virtualization engine (PPE/VE) 150 is module that may be incorporated in some systems to support an operational mode called "virtual computing," or alternatively, for performing packet processing operations that are normally handled by a peripheral device, such as a NIC. For virtual computing, hardware, firmware, and/or software within a physical computing system may cooperate to create several "virtual" computing environments. "Guest" software executes within one of these environments as if it had a complete, independent physical system at its sole disposal, but in reality, all the resources the guest sees are emulated or shared from the underlying physical system, often under the control of low-level software known as a "hypervisor." The packet processing engine 150, operating as a Virtualization engine, may contribute to the creation of virtual machines, or virtual machine monitors, by presenting virtual instances of other modules. For example, PPE/VE 150 may use peripheral interconnect 136 and its connected NIC 196 to create several logical NICs that can be allocated to guest software running in different virtual machines. All low-level signaling and data transfer to and from the network may occur through the physical NIC 196, but PPE/VE 150 may separate traffic according to the logical NIC to which it was directed, and the main memory (e.g., "behind" the memory controller) to which it is to be written.

For example, DMA target within PPE/VE 150 may be configured by a microengine to transfer data from data storage to memory as part of performing a task on one of the work queues. In an exemplary embodiment of a DMA transfer first, a microengine programs DMA target so that it has the information necessary to execute the transfer. Next, the DMA target issues a "read/request-for-ownership" (RFO) protocol request to the bus interface unit, which forwards it to the memory controller. Later, an RFO response comes from the memory controller to the bus interface unit and is passed to the targets. The DMA target within the PPE/VE 150 may correlate RFO requests and responses. The DMA target obtains data from the data storage and issues a write to the bus interface unit. The bus interface unit completes the write by forwarding the data to the memory controller, and accordingly, to system memory.

In this example, the DMA target may have two options to ensure that a module or software entity that is waiting for the data does not begin processing before all the data has been sent: it can issue all writes in any convenient order and send an "end of transfer" ("EOT") signal to the micro engine after all writes are completed; or it can issue the first 63 byte cache line writes in any convenient order (for example, each write to be issued as soon as the RFO response arrives) then issue the last byte write after the preceding 63 writes have completed. These orderings can ensure that a producer-consumer (P/C) relationship between software entities concerned with the data is maintained. The DMA target selects the order of protocol requests and write operations to avoid breaking the producer-consumer paradigm, because the target cannot (in general) know whether the data it is moving is the "data" of the P/C relationship or the "flag" to indicate the availability of new data.

On the other hand, some targets can tell whether information is the "data" or the "flag" of a P/C relationship. Or, more precisely, some targets can be certain that two write operations are not logically related, and consequently the operations may be performed in either order without risk of logical malfunction. For example, a target that caches data locally to improve its own performance may write "dirty" cache lines back to main memory in any order because the target itself is the only user of the cache lines—the target may provide no interface for a producer and a consumer to synchronize their operations on the target's cache contents, so no P/C relationship could be impaired.

These examples illustrate how delegating write protocol ordering choices to individual targets within a peripheral or input/output management chipset can permit easier optimization of write ordering within the limitations of the targets' interfaces. Centralizing the various ordering possibilities in a single module (for example, in the bus interface unit) may increase the complexity of the module or make it slower or more expensive.

In some embodiments, the functions of the I/O management chipset may be distributed differently than described in the previous examples and figure. For example, the IOH 115 may be a memory controller hub (MCH), as described below with respect to FIG. 2.

Figure 2:
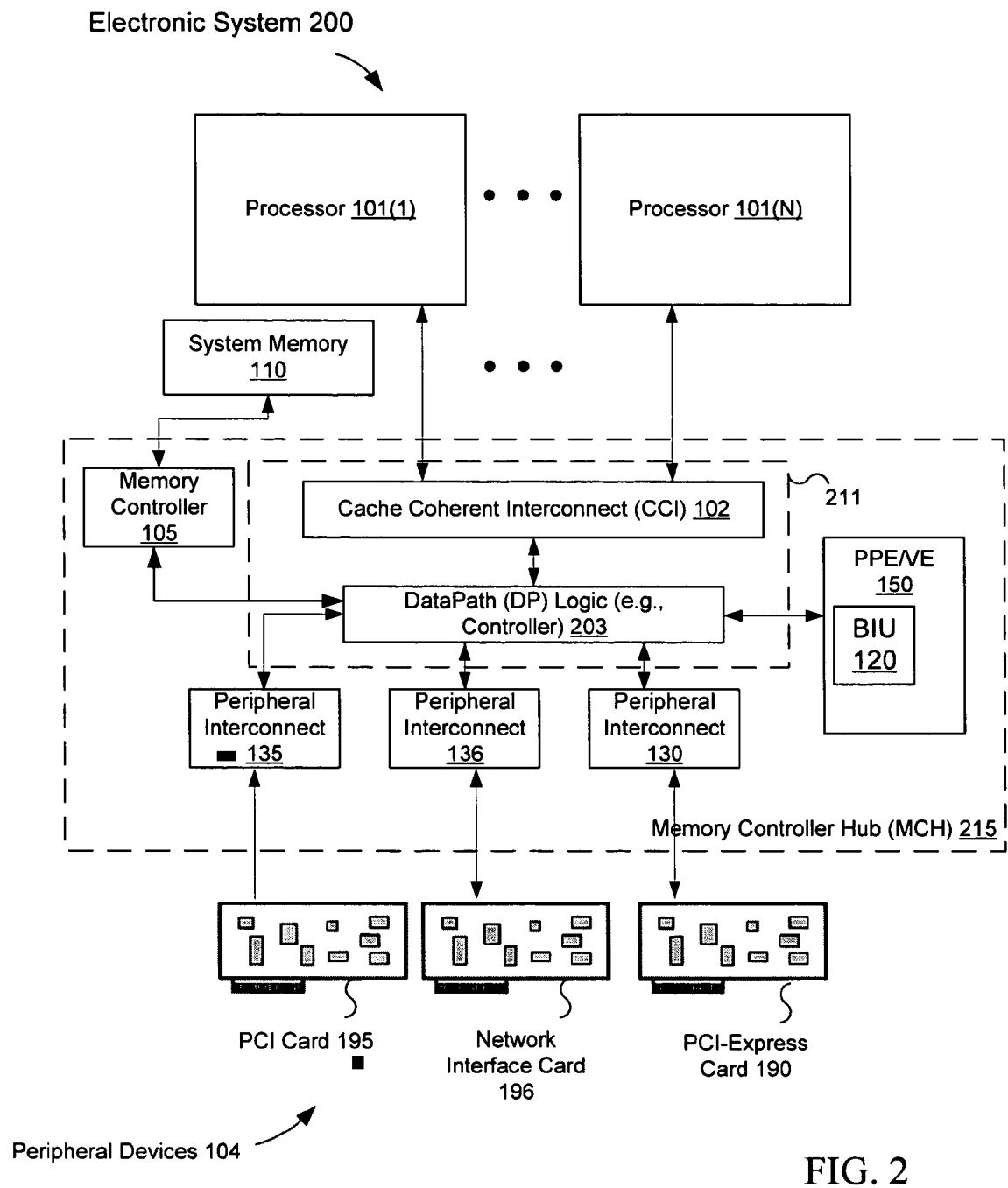
FIG. 2 illustrates a block diagram of one embodiment of an electronic system, including a packet processing engine/virtualization engine (PPE/VE), located within memory controller hub (MCH).

FIG. 2 illustrates a block diagram of one embodiment of an electronic system, including a packet processing engine/virtualization engine (PPE/VE), located within memory controller hub (MCH). Electronic system 200 includes similar or identical components as electronic system 100. Processor 101 and system memory 110 may be similar or identical to the components discussed earlier. However, in this arrangement, access from processor 101 and other memory clients such as peripherals to system memory 110 is mediated by memory control hub (MCH) 215. Electronic system 200 may include one common system memory 110(1). MCH 215 may manage the RFO protocol internally, providing simpler memory interfaces to clients such as processor 101 and peripherals 104. Some systems may use an auxiliary data consolidator to reduce the complexity and number of interfaces MCH must provide (in such a system, MCH 215 would interact with the consolidator instead of directly with the peripherals "behind" the consolidator.) The consolidator could multiplex or otherwise group transactions from its peripherals, and de-multiplex responses from MCH 215. The peripherals themselves might be any device that could be connected to the system described with reference to FIG. 1 (for example, a network interface, a storage interface, or a video adapter).

The MCH can interact with its clients and accept memory transactions in a first order, but execute them in a second order, so long as the second order preserves the semantics of producer-consumer relationships.

MCH 215 may include a BIU 211 or local bus controller. The BIU 211 of MCH 215 may include CCI 102, and DP logic 203 (e.g., controller). The BIU 211 may consolidate operations from several of the modules located "below" it, e.g., peripheral interconnects 130, 135, and 136, DMA engine 140 and PPE/VE 150. These modules, or "targets," perform various functions that may be of use in the overall system's operation, and—as part of those functions—may need to write data to system memory 110.

In one embodiment, electronic system 100 or electronic system 200 may be in a workstation, or alternatively, in a server. Alternatively, the embodiments described herein may be used in other processing devices.

The electronic system 100 or electronic system 200 may include a cache controller to manage other modules' interactions with memory 110 so that the cache's contents are reliably consistent ("coherent") with memory. The storage for the cache itself may be elsewhere (for example, within processor 101), and the cache controller may monitor modules' interactions and produce signals to invalidate certain cache entries when the underlying memory contents have changed.

Other peripherals that implement an appropriate hardware interface may also be connected to the system. For example, a graphics adapter (e.g., video card) might be connected through an AGP interface. (AGP interface and video card not shown in this figure.) Cryptographic accelerator 145 is another representative peripheral device that might be incorporated in I/O hub 115 to manipulate (e.g. encrypt or decrypt) data traveling between another module or external device and memory 110. A common feature of peripheral interconnects 130 and 135, DMA engine 140 and cryptographic accelerator 145 that is relevant to embodiments of the invention is that all of these modules may send data to "upstream" modules such as processor 101, cache controller 105, or memory 110.

Figure 3:
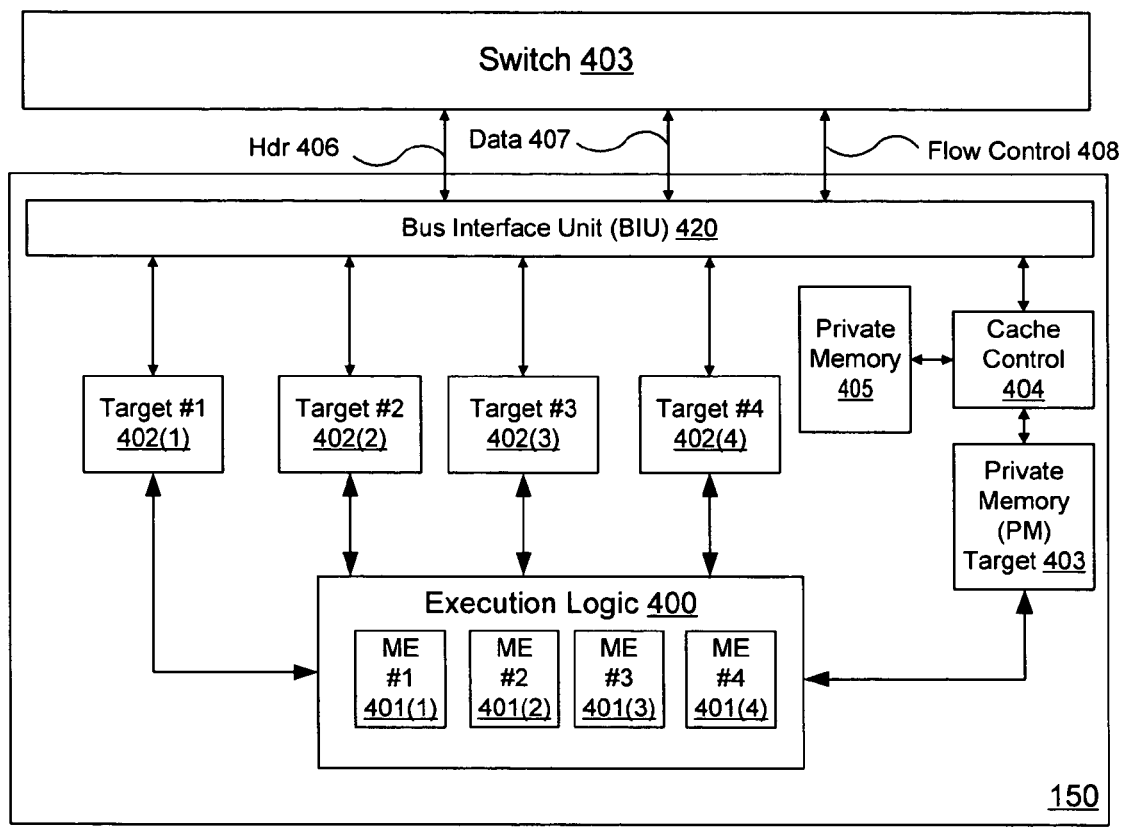
FIG. 3 illustrates one embodiment of a PPE/VE, including a plurality of targets, and execution logic, having a plurality of microengines (MEs).

FIG. 3 illustrates one embodiment of a PPE/VE, including a plurality of targets, and execution logic, having a plurality of microengines (MEs). PPE/VE 150 includes a BIU 420, execution logic 400, including a plurality of MEs 401(1)-401(4).

In this embodiment, there are four MEs or main processing entities or elements. Alternatively, more or less than four MEs may be used in the execution logic 400. PPE/VE 150 is coupled to the data path logic 103 (e.g., switch 103) The switch 103 and PPE/VE 150 transfer/receive between one another data, such as data packets, using one or more channels, as described below. The data packets may include header data 406, and data 407. Switch 103 and PPE/VE 150 may also transfer/receive flow control 408. These may be all in one data packet, or may be transferred or received in separate data packets, or data streams.

One of the multiple targets of the PPE/VE 150 may be Private Memory (PM) Target 403. PM Target 403 may be coupled to a cache or memory control block 404, which is coupled to memory, such as private memory 405. PM 405 may store connection context related information, as well as other data structures. Private memory 405 may be cache, and may reside in the PPE/VE 150. Alternatively, private memory 405 may be other types of memory, and may reside outside the PPE/VE 150.

Figure 4:
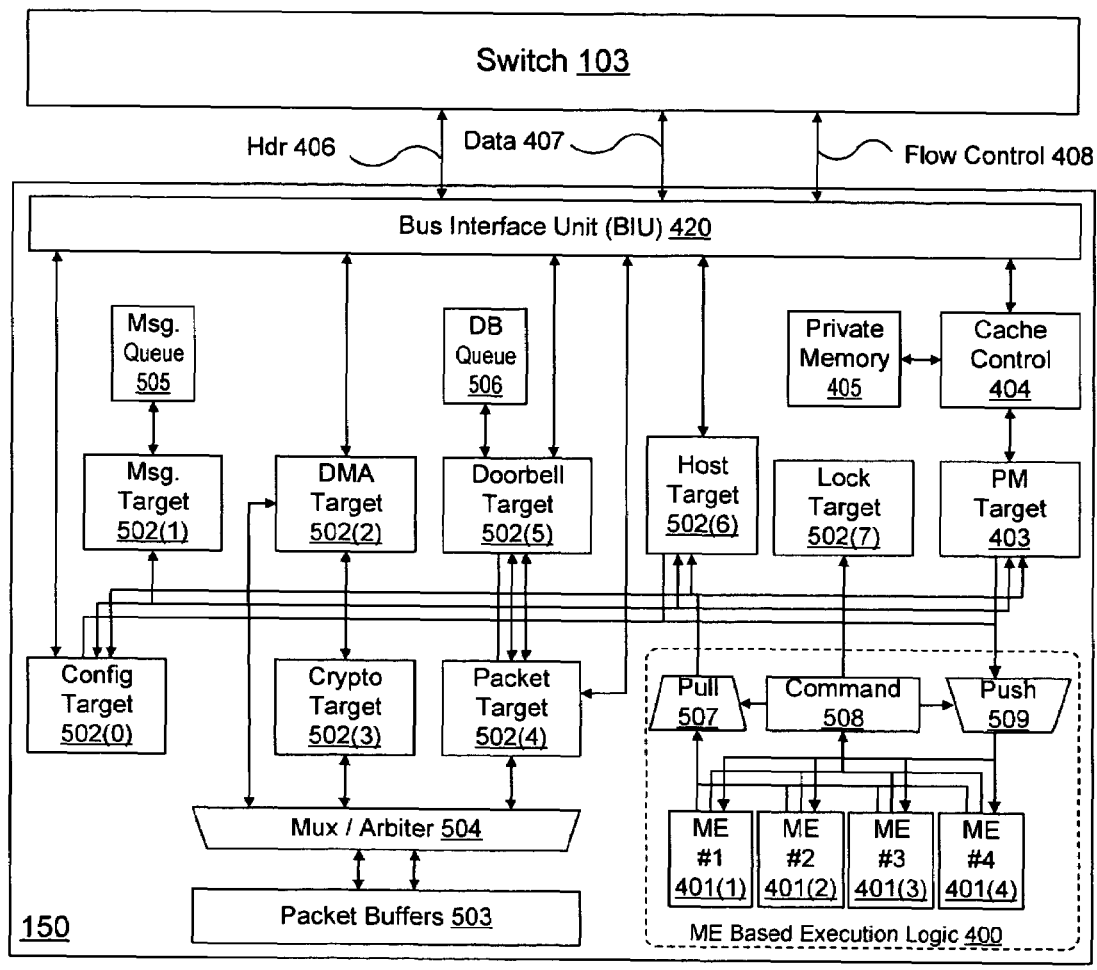
FIG. 4 illustrates another embodiment of a PPE/VE, including a plurality of targets, and execution logic, having a plurality of microengines (MEs).

FIG. 4 illustrates another embodiment of a PPE/VE, including a plurality of targets, and execution logic, having a plurality of microengines (MEs). As previously described, the PPE/VE 150 may include a plurality of targets 502, and execution logic 400. The plurality of targets 502, as illustrated in FIG. 4, may include Lock Target 502(7), DMA Target 502(2), Doorbell Target 502(5), Message Target 502(1), Configuration (Config) Target 502(0), Host Target 502(6), and Cryptographic Accelerator (Crypto) Target 502(3). One of the targets 502 may be a Packet Target 502(4). The packet data may be stored in the Packet Target 502(4). All the targets 502 are coupled to the BIU 420, and some targets are coupled to one another, and some to the execution logic 400. These hardware assists may be used to assist the MEs to perform specific operations of the PPE/VE 150, and in particular, packet processing operations, and/or virtualization operations. The Private Memory (PM) Target provides access to the Packet Processing Engine's private memory. The Lock Target provides PPE-wide resource arbitration and lock services. The Host Target provides access to the host system's memory space. The Doorbell Target provides access to the doorbell queue. Doorbell queues are used to notify the PPE that new work requests are enqueued to the work queues that reside in system memory. The DMA Target provides the payload transfer services. The Messaging Target provides inter-thread messaging services. Configuration (Config) Target 502(0) is used to configure the PPE/VE. The PCI EXPRESS® Target provides access paths to external Media Access Control (MAC) control registers. The Crypto Target provides encryption and decryption services necessary to support IPSec and SSL Protocols. The Packet Target provides an access path from MEs to packets in the packet buffer. The Cache Control block caches PPE's private memory—whether it is in system memory or in a side RAM. The Mux/Arbiter block provides arbitration functions and the access path to the packet buffers.

In one embodiment, the execution logic 400 includes a plurality of MEs 401(1)-401(4) coupled to pull block 507, command block 508, and push block 509. Depending on the type of command being processed, targets either pull data from ME transfer registers or push data to ME transfer registers or both. The Push/Pull logic helps with these operations.

In addition, PPE/VE 150 may also include message queue 404, and doorbell (DB) queue 506 coupled to Message Target 502(1), and Doorbell Target 502(5), respectively. PPE/VE 150 may also include an arbiter 504 (e.g., mux/arbiter), and packet buffers 503. The Mux/Arbiter block provides arbitration functions and the access path to packet buffers. As described below, the packet buffers may be used to store data packets during transactions of the PPE/VE 150.

Figure 5A:
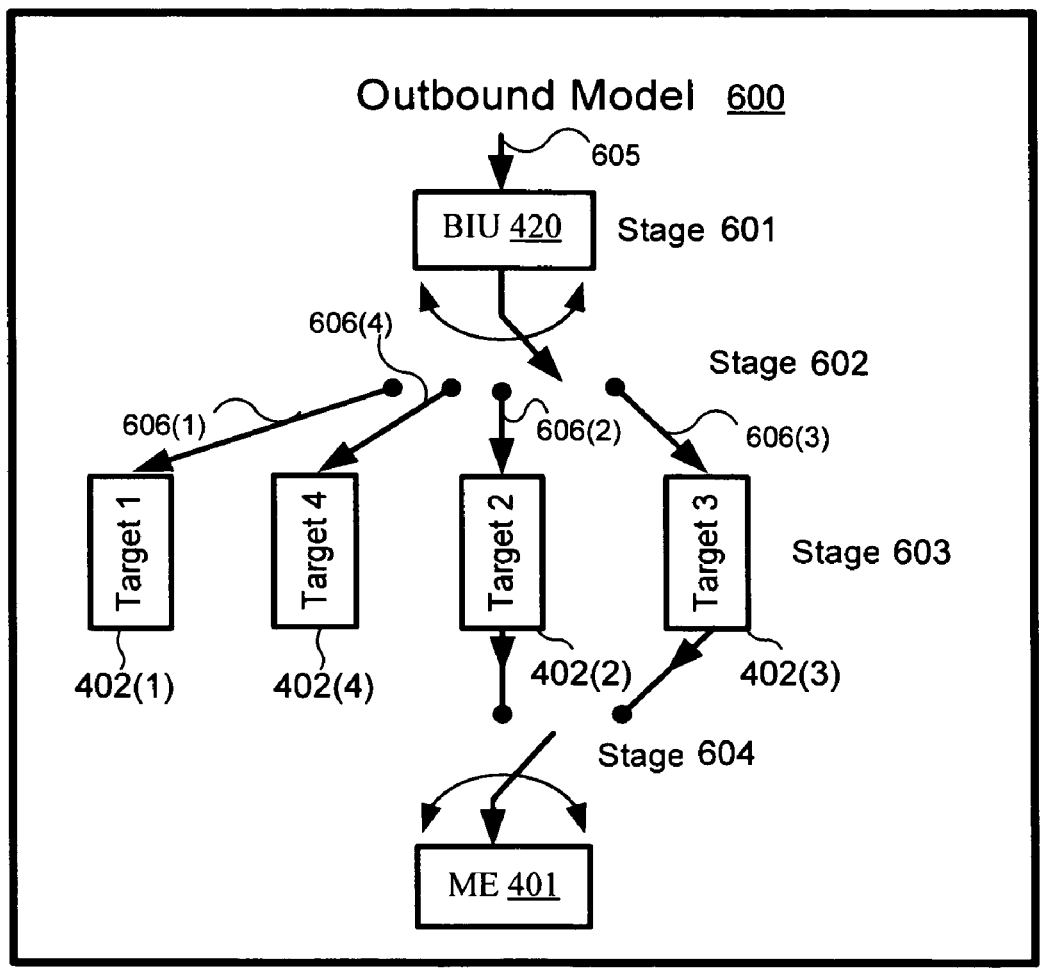
FIG. 5A illustrates a flow diagram of one embodiment of an outbound model of the transaction flow within the PPE/VE as the transactions from the data path (DP) logic to a microengine of the PPE/VE.

FIG. 5A illustrates a flow diagram of one embodiment of an outbound model 600 of the transaction flow within the PPE/VE as the transactions from the data path (DP) logic to a microengine of the PPE/VE. As the transactions are headed into the PPE/VE 150 they follow ordering rules, such as PCI EXPRESS® ordering rules. If the BIU 420 were to pass on these transactions to the different targets, without waiting for the transaction to be completed and therefore globally visible, this could result in an ordering violation. To avoid this problem, the streams 605 of traffic, entering the PPE/VE 150 at BIU 420, may be split into P/NP transactions from the processor 101, P/NP transactions from the peripheral device (e.g., NIC) and Completions, stage 601. The P/NP Requests from the processor 101 may be addressed to the Doorbell Target 502(5). The P/NP from the peripheral device (e.g., NIC) may be addressed to the Packet Buffers 503. Thus in the BIU 420, the implementation will be responsible for splitting the incoming stream, stage 602, and then maintaining the PCI Ordering for each stream, stage 603. In other words, the incoming stream 605 may be split into one or more streams (e.g., 606(1)-606(4)). In addition, some of the targets (e.g., 402(2) and 402(3) of FIG. 5A) may operate in connection with the MEs 401 of execution logic 400, stage 604.

The ordering relationship between the BIU 420 and the Targets (e.g., 402, 502) would have to ensure that ordering rules are not violated. This may be a joint responsibility of the BIU 420 and the Targets. The traffic from the peripheral device (e.g., NIC) may be serviced by the Packet Buffers 503. Once the Packet Buffers 503 have accepted a transaction from the BIU 420, it may be the responsibility of the Packet Buffers 503 to maintain ordering. Similarly, in the case of the traffic flow from the processor 101 to the Doorbell Target 502(5). Once the Doorbell Target 502(5) has accepted a transaction from the BIU 420, it may be the responsibility of the Doorbell Target 502(5) to maintain ordering. There are no ordering constraints on the completions received from the switch 103 with respect to other completions. Accordingly, if the completions were to go to different targets, once the target accepted the completion, the BIU 420 could move on to servicing the next completion even if it went to another target.

Figure 5B:
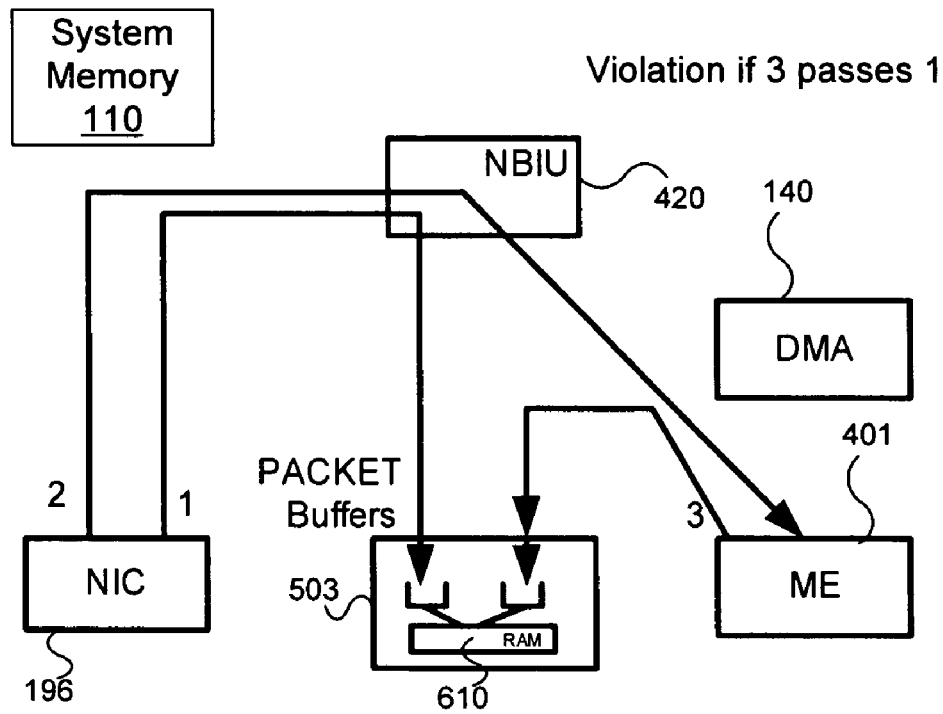
FIG. 5B illustrates a flow diagram of one exemplary embodiment of an ordering violation in a receive transaction.

FIG. 5B illustrates a flow diagram of one exemplary embodiment of an ordering violation in a receive transaction. FIG. 5B is an example of the ordering violations that would occur if the stream from the NIC 196 was routed to multiple targets, in particular packet buffers 503, and ME 401. Here the NIC 196 writes data to the Packet Buffers 503, and updates the status, operation 607. In a second operation, the NIC 196 sends interrupt to the ME 401, and in particular to the MAC Driver, operation 608. The Driver of the ME 401 then tries to access the data stored in memory 610 (e.g., random access memory (RAM)), operation 609, and may possibly pass the data that was initial sent from the NIC 196 to the packet buffers 503 during operation 607, which may be queued up in the packet buffers 503. Accordingly, if in operation 609, the driver tries to access the data stored in 610 and passes the data that is queued up, a violation of ordering rules occurs.

In one embodiment, memory 610 is private memory 405. Alternatively, memory 610 is memory a separate on-chip memory module.

Figure 5C:
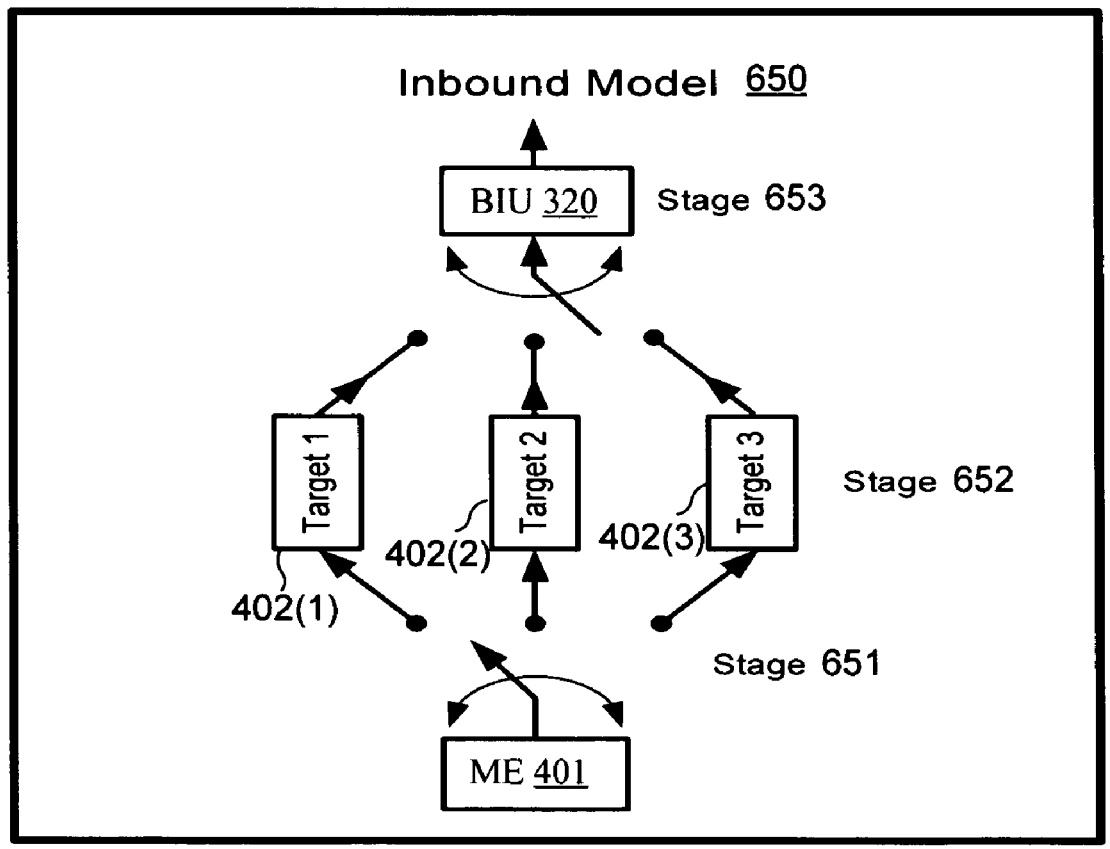
FIG. 5C illustrates a flow diagram of one embodiment of an inbound model of the transaction flow from a microengine of the PPE/VE to the DP.

FIG. 5C illustrates a flow diagram of one embodiment of an inbound model of the transaction flow from a microengine of the PPE/VE to the DP. In particular inbound model 650 shows the flow of transactions from the microengine 401, operation 651; to the targets 402 (e.g., 402(1)-402(3)), operation 652; and then out of the PPE/VE 150 to the DP logic (e.g., switch 103), operation 653. In one exemplary embodiment, the ME 401 tells DMA Target 502(2) to initiate a DMA between the Packet Buffers 503 and System Memory 110. Since the communication from the ME 401 to the System Memory 110 may go through different targets (e.g., 402(1)-402(3)) this model lends itself to ordering violations.

Figure 5D:
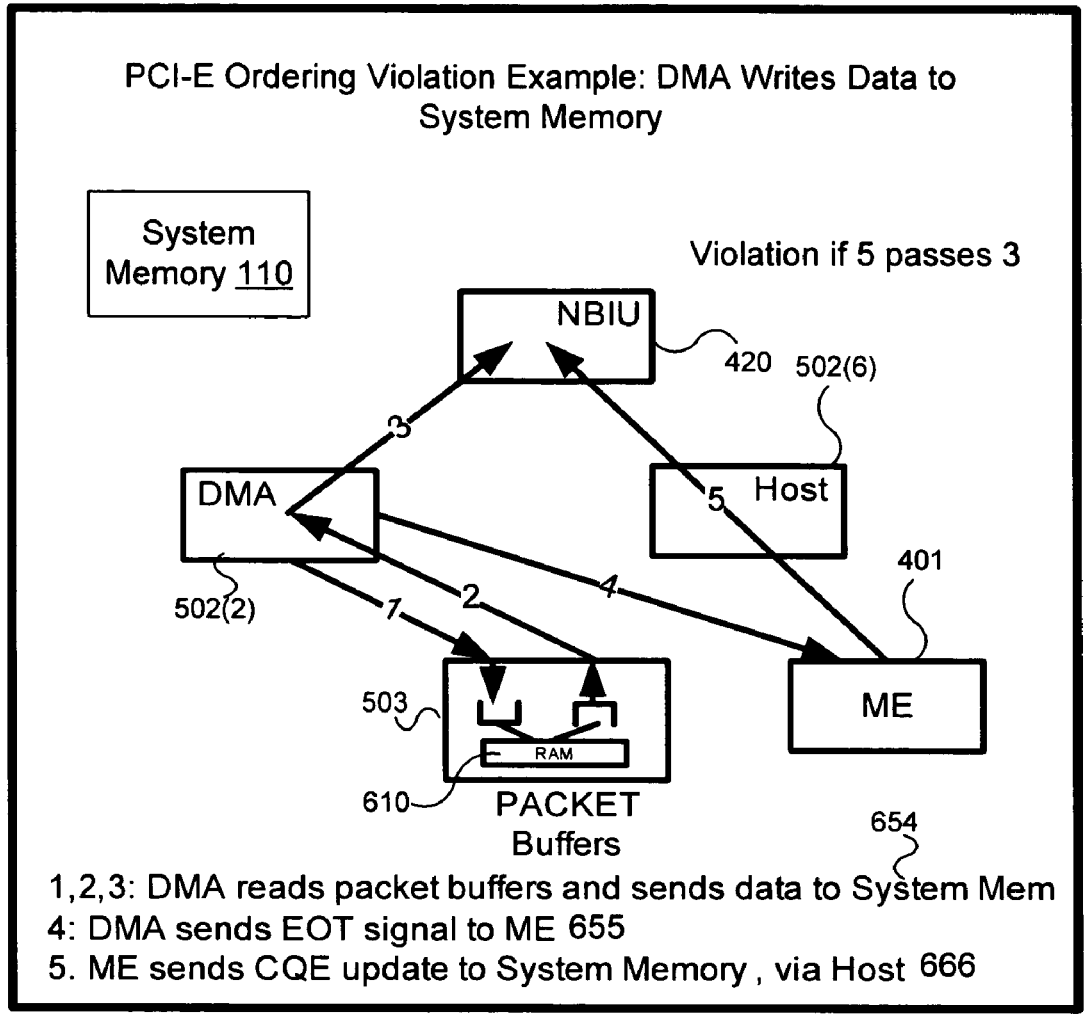
FIG. 5D illustrates a flow diagram of one exemplary embodiment of an ordering violation in a transmit transaction.

FIG. 5D illustrates a flow diagram of one exemplary embodiment of an ordering violation in a transmit transaction. FIG. 5B is an example of the ordering violations that would occur if the DMA target 502(2) moves data to system memory 110 and then have the ME 401 update the Completion Queue Entry (CQE) in system memory 110. There is the possibility of the CQE update passing the data sent to system memory 110 by the DMA target 502(2), which would cause an ordering violation. In particular, the DMA target 502(2) reads data packets from packet buffers 503 and sends data to system memory 110, operations 654. Next, the target 502(2) sends an EOT signal to the ME 401, operation 655. Consequently, the ME 401 may send a CQE update to system memory 110, via Host Target 502(6), operations 666. If the operations 666 pass the operations 654, an ordering violation will occur.

To address such traffic violations, the ME 401 may take responsibility of assigning each request with a stream identifier. When a target (402) receives a request from the ME 401, the request may be tagged with a stream identifier. It then can become the responsibility of the target to process the request and send it to the BIU 420. Only after the BIU 420 has accepted the request, the target may respond back to the ME 401 with a completion. The ME 401 may then issue a request to another target with the same stream identifier. This second request would be certain to be ordered behind the first request because they have the same stream identifier. Accordingly, traffic that uses different stream identifiers has no ordering relationship to each other.

The transaction ordering and flow within the PPE may be implemented in several ways (based on the level of performance required) by creating multiple traffic domains. It should be noted that each traffic domain has to abide by the Producer Consumer ordering rules. However, there is no ordering rules or requirement between the separate traffic domains.

Figure 6A:
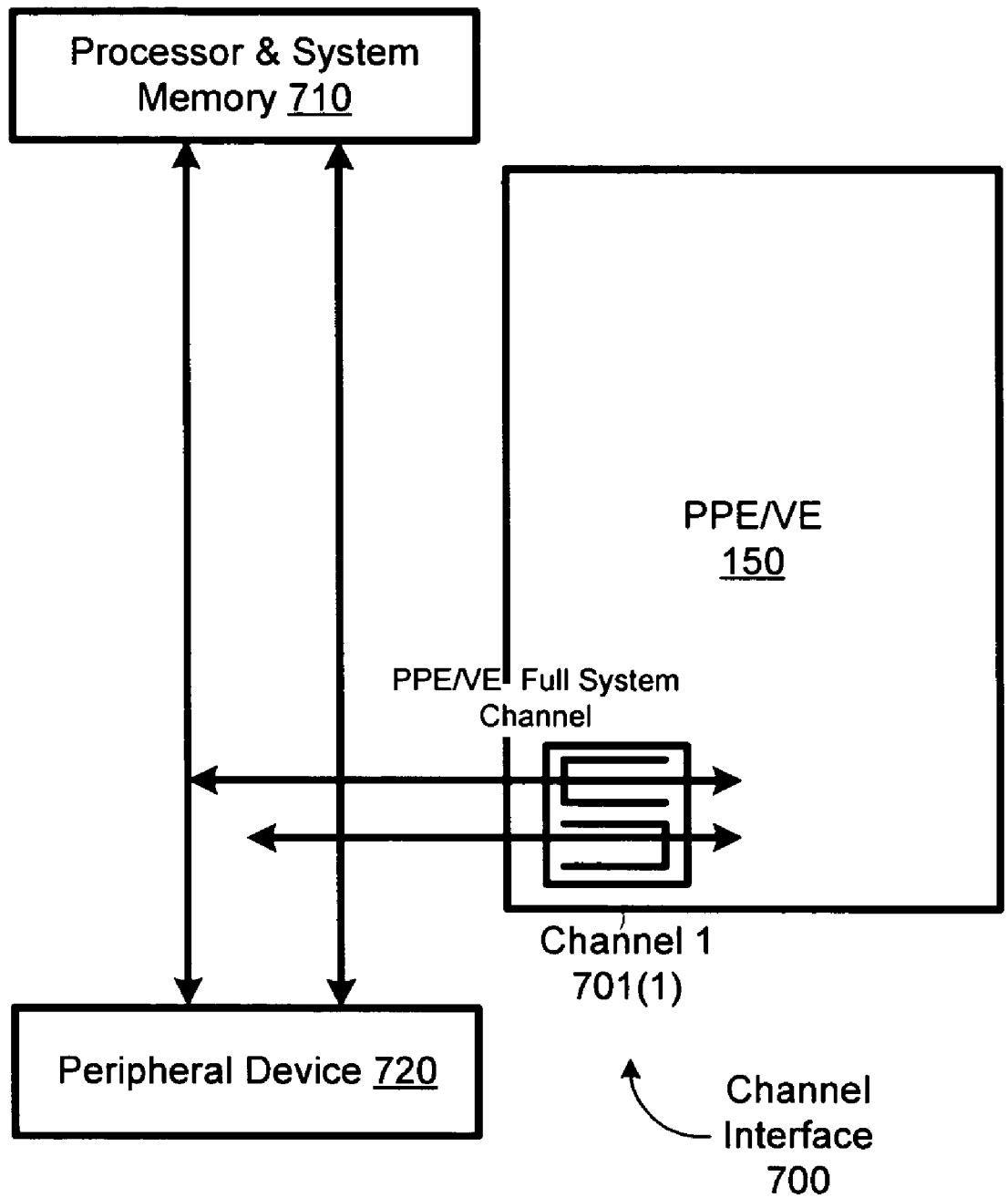
FIG. 6A illustrates one embodiment of traffic flow of a channel interface between a PPE/VE and a processor, system memory, or a peripheral device.

FIG. 6A illustrates one embodiment of traffic flow of a channel interface between a PPE/VE and a processor, system memory, or a peripheral device. Channel interface 700 includes a single channel 701(1), including inbound and outbound traffic domains. The inbound and outbound refer to the direction of data transaction flow in and out of the PPE/VE 150. Channel 701(1) may be used to interface the PPE/VE 150 with processor and system memory 710, and peripheral device 720. Processor and system memory 710 may include processor 101 and system memory 110. System memory 110 may be directly coupled to the hub, as described with respect to FIG. 2, or alternatively, coupled to the processor 101, which is coupled directly to the hub, as described with respect to FIG. 1. In another embodiment, processor and system memory 710 may include one or more processors, and may include one or more system memories. Peripheral device 720 may be a network interface card (NIC) 196, a mass storage interface card, or a graphics adapter (e.g., video card). Alternatively, peripheral device 720 may be other peripheral devices known by those of ordinary skill in the art.

In this embodiment, one physical channel is used to interface the processor and system memory 710 and the peripheral device 720 to the PPE/VE 150. This may be referred to as a full system channel.

Figure 6B:
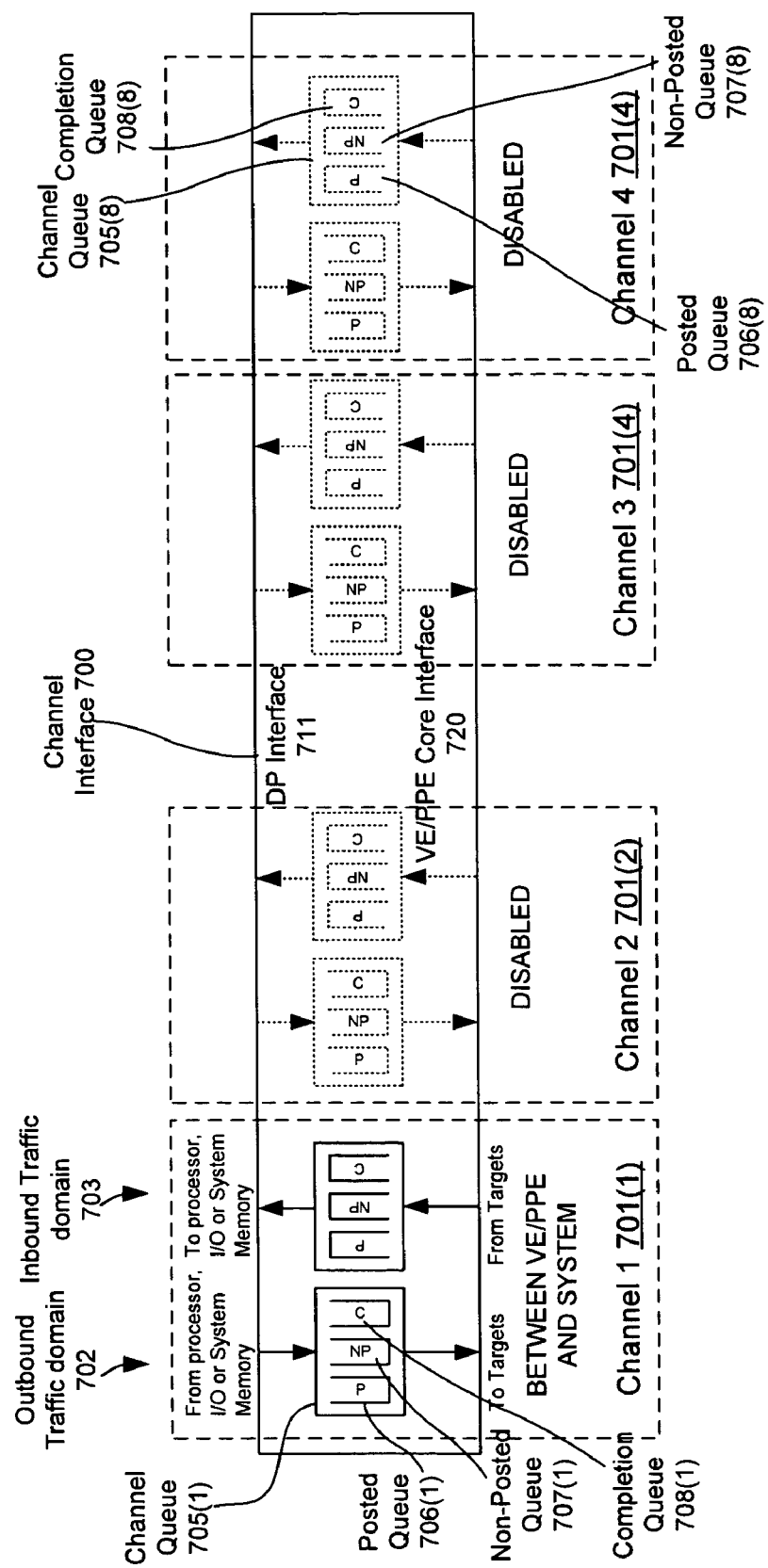
FIG. 6B illustrates the channel interface of FIG. 6A, including a plurality of traffic domains.

FIG. 6B illustrates the channel interface of FIG. 6A, including a plurality of traffic domains. Channel interface 700 is an interface between the DP interface 711 and the PPE/VE core interface 720. The DP interface 711 represents the interface to either processor and system memory 710 or peripheral device 720. In a first mode, the channel interface 700 may include one active channel. In one embodiment, the channel interface 700 includes four physical channels, and three of the four channels are disabled, channels 701(2)-701(4). Alternatively, the channel interface 700 may include more or less channels than four.

Channel 701(1) includes an outbound traffic domain 702, and an inbound traffic domain 703. Each of the inbound and outbound traffic domains include a posted queue (e.g., 706(1)), a non-posted queue (e.g., 707(1)), and a completion queue (e.g., 708(1)). The individual queues in channel queues 705(1)-705(8) are labeled "P" for "Posted," "NP" for "Non-Posted," and "C" for "Completion. Different types of memory transactions are enqueued on each of the queues within a channel (each channel operates the same, so only one channel's operation will be described).

A "Posted" transaction may be a simple "write" operation: a Target requests to transfer data to an addressed location in memory, and no further interaction is expected or required. A "Non-Posted" transaction may be a "read" request: a Target wishes to obtain data from an addressed location in memory, and the NP transaction initiates that process. A reply (containing the data at the specified address) is expected to arrive later. A "Completion" transaction may be the response to an earlier "read" request from the processor to the peripheral: it contains data the peripheral wishes to return to the system.

In one embodiment, the memory transactions of the queues may be enqueued, selected, executed, and retired according to the following ordering rules:
Posted transactions can pass any transaction except another posted transaction (nothing can pass a posted transaction)
Non-posted transactions can pass other non-posted transactions or completion transactions
Completion transactions can pass other completion transactions or non-posted transactions.

Observing the foregoing rules ensures that producer/consumer relationships are not affected by ordering memory transactions, and provides some flexibility in transaction issuing order that may help the system make progress when some of the queues are blocked by flow-control requests from upstream components, or when some transactions cannot be completed immediately for other reasons.

The posted queue 706(1), non-posted queue 707(1), and the completion queue 708(1) of the outbound traffic domain 702 are used for transactions from processor 101, peripheral device 104, or system memory 110 (e.g., peripheral device 720 and/or processor and system memory 710) to the targets 402 of the PPE/VE 150.

The posted queue 706(2), non-posted queue 707(2), and the completion queue 708(2) of the inbound traffic domain 703 are used for transactions from the targets 402 of the PPE/VE 150 to the processor 101, peripheral device 104, or system memory 110 (e.g., peripheral device 720 and/or processor and system memory 710).

Figure 7A:
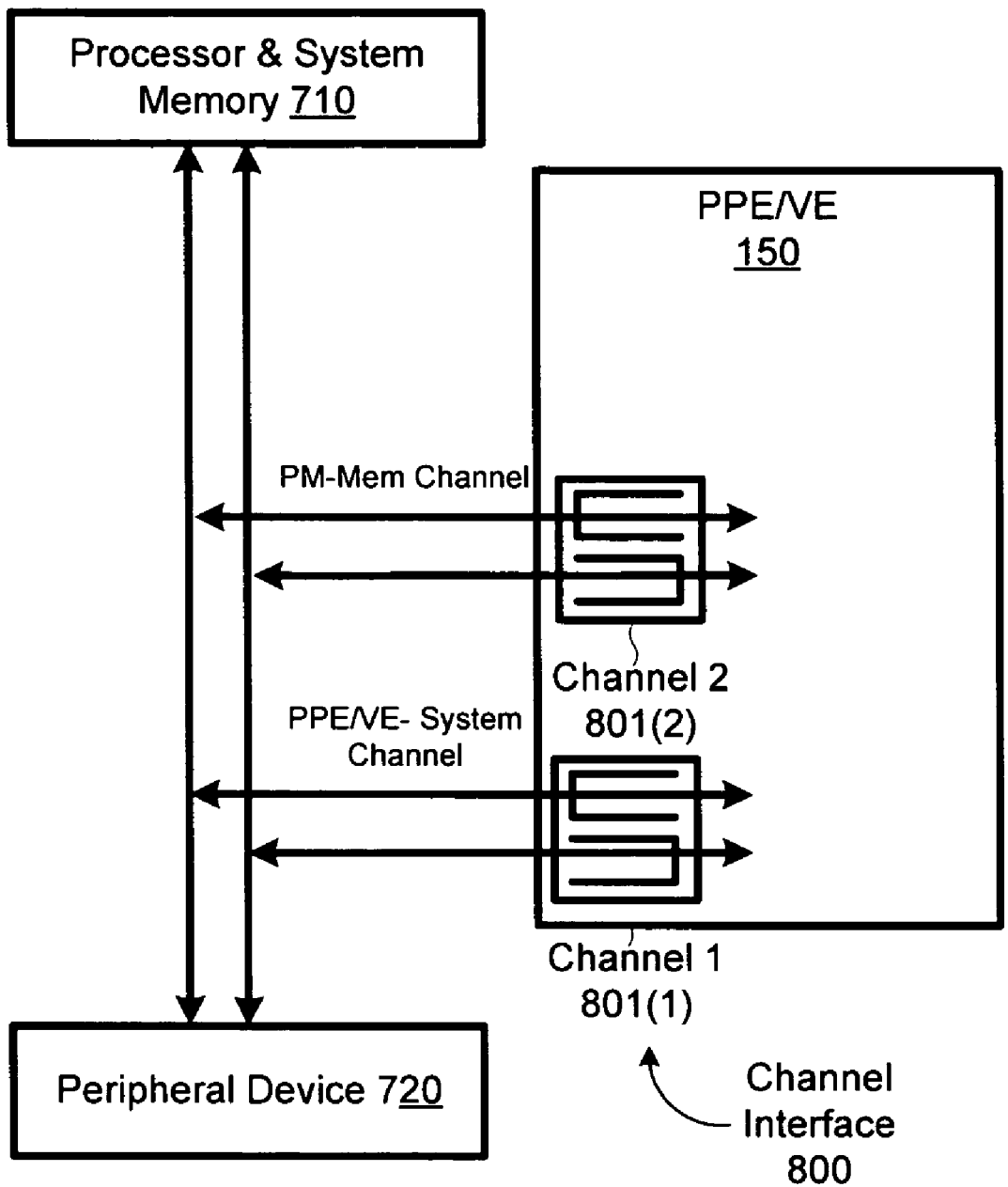
FIG. 7A illustrates another embodiment of traffic flow of a channel interface between the PPE/VE and a processor, system memory, or a peripheral device.

FIG. 7A illustrates another embodiment of traffic flow of a channel interface between the PPE/VE and a processor, system memory, or a peripheral device. Channel interface 800 includes two channels 801(1) and 801(2), both including inbound and outbound traffic domains. Channel 801(1) may be used to interface the PPE/VE 150 with processor and system memory 710, and peripheral device 720. Channel 801(2) may be used to interface the Private memory 405 of the PPE/VE 150 with processor and system memory 710. Processor and system memory 710 may include processor 101 and system memory 110.

In this embodiment, there are two physical channel is used to interface the processor and system memory 710 and the peripheral device 720 to the PPE/VE 150, and one channel dedicated to transactions between Private memory 405 of the PPE/VE 150 to system memory 110.

Figure 7B:
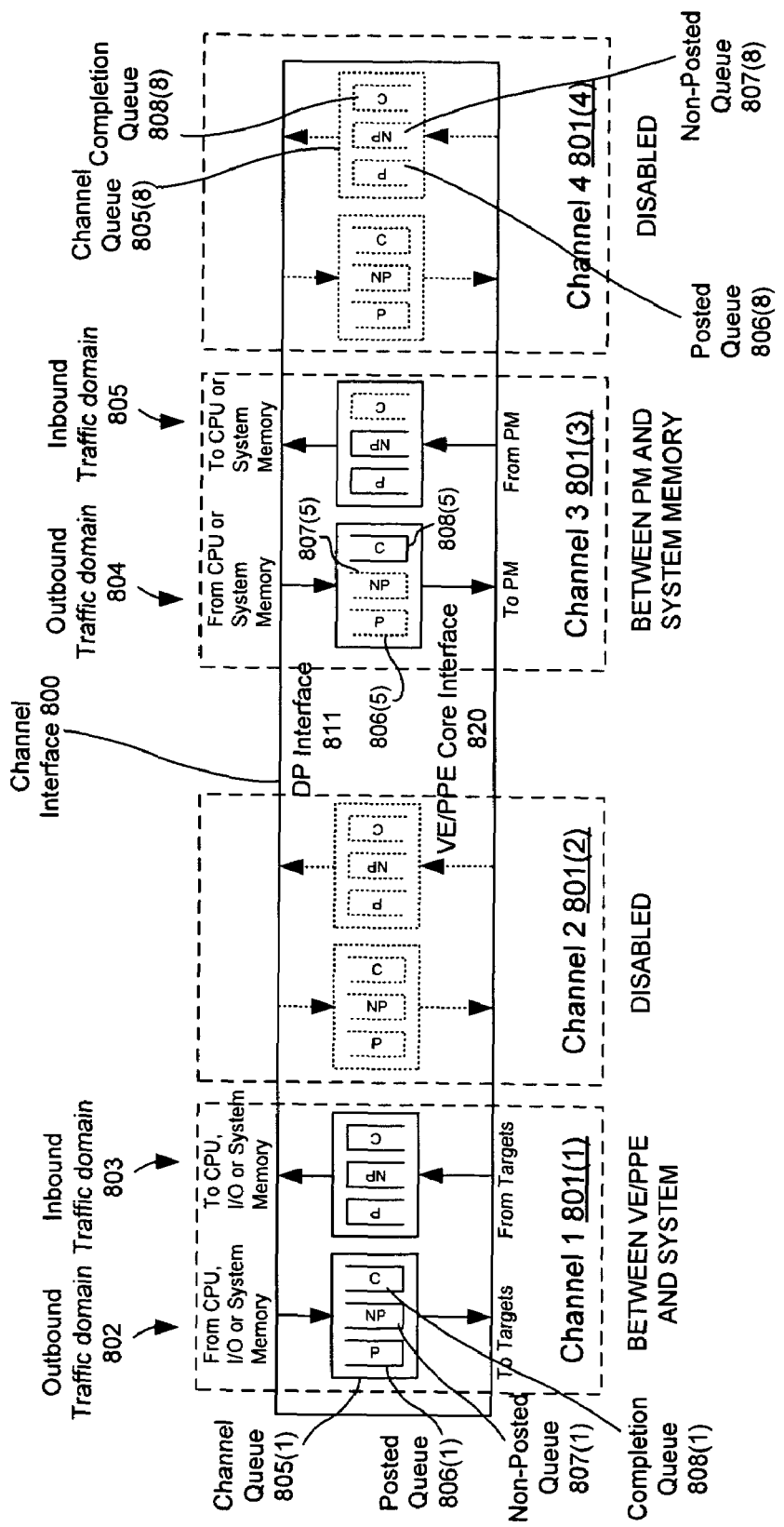
FIG. 7B illustrates the channel interface of FIG. 7A, including a plurality of traffic domains.

FIG. 7B illustrates the channel interface of FIG. 7A, including a plurality of traffic domains. Channel interface 800 is an interface between the DP interface 811 and the PPE/VE core interface 820. The DP interface 811 represents the interface to either processor and system memory 710 or peripheral device 720. In a second mode, the channel interface 800 may include two active channels (e.g., channels 801(1) and 801(3)). In one embodiment, the channel interface 800 includes four physical channels, and two of the four channels are disabled, channels 801(2) and 801(4). Alternatively, the channel interface 800 may include more or less channels than four.

Channels 801(1) and 801(3) both include outbound traffic domains 802 and 804, respectively, and inbound traffic domains 803 and 805, respectively. Each of the outbound and inbound traffic domains include a posted queue (e.g., 806(1) and 806(5)), a non-posted queue (e.g., 807(1) and 807(5)), and a completion queue (e.g., 808(1) and 808(5)).

The posted queue 806(1), non-posted queue 807(1), and the completion queue 808(1) of the outbound traffic domain 802 are used for transactions from processor 101, peripheral device 104, or system memory 110 to the targets 402 of the PPE/VE 150. The posted queue 806(2), non-posted queue 807(2), and the completion queue 808(2) of the inbound traffic domain 803 are used for transactions from the targets 402 of the PPE/VE 150 to the processor 101, peripheral device 104, or system memory 110 (e.g., peripheral device 720 and/or processor and system memory 710).

The posted queue 806(5), non-posted queue 807(5), and the completion queue 808(5) of the outbound traffic domain 804 are used for transactions from processor 101 or system memory 110 (e.g., peripheral device 720 and/or processor and system memory 710) to the Private Memory (PM) target 403 of the PPE/VE 150. The posted queue 806(6), non-posted queue 807(6), and the completion queue 808(6) of the inbound traffic domain 805 are used for transactions from the PM target 403 of the PPE/VE 150 to the processor 101, peripheral device 104, or system memory 110 (e.g., peripheral device 720 and/or processor and system memory 710).

In one exemplary embodiment, outbound and inbound traffic domains 804 and 805 are used for memory transactions between private memory 405 and system memory 110, and traffic domains 802 and 803 are used for other transactions between the PPE/VE 150, peripheral device 720, and processor and system memory 710. Alternatively, the traffic domains 804 and 805 may be used for other transactions to the peripheral device 720, and/or processor and system memory 710.

Figure 8A:
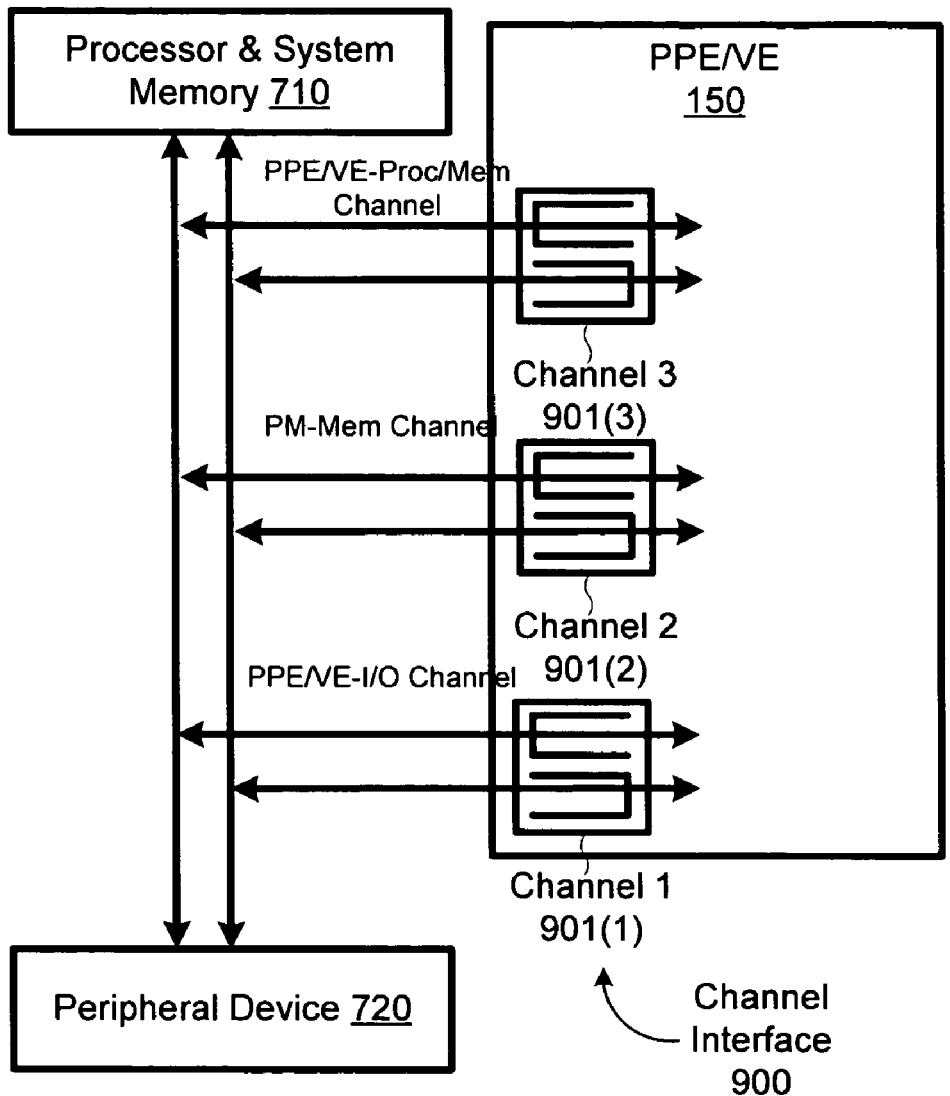
FIG. 8A illustrates another embodiment of traffic flow of a channel interface between the PPE/VE and a processor, system memory, or a peripheral device.

FIG. 8A illustrates another embodiment of traffic flow of a channel interface between the PPE/VE and a processor, system memory, or a peripheral device. Channel interface 900 includes three channels 901(1)-901(3), all including inbound and outbound traffic domains. Channel 901(1) may be used to interface the PPE/VE 150 with peripheral device 720. Channel 901(2) may be used to interface the Private memory 405 of the PPE/VE 150 with processor and system memory 710. Channels 901(3) may be used to interface the other targets of the PPE/VE 150 with the processor and system memory 710. Processor and system memory 710 may include processor 101 and system memory 110.

In this embodiment, there are two physical channel is used to interface the processor and system memory 710 and the peripheral device 720 to the PPE/VE 150, and one channel dedicated to transactions between Private memory 405 of the PPE/VE 150 to system memory 110.

Figure 8B:
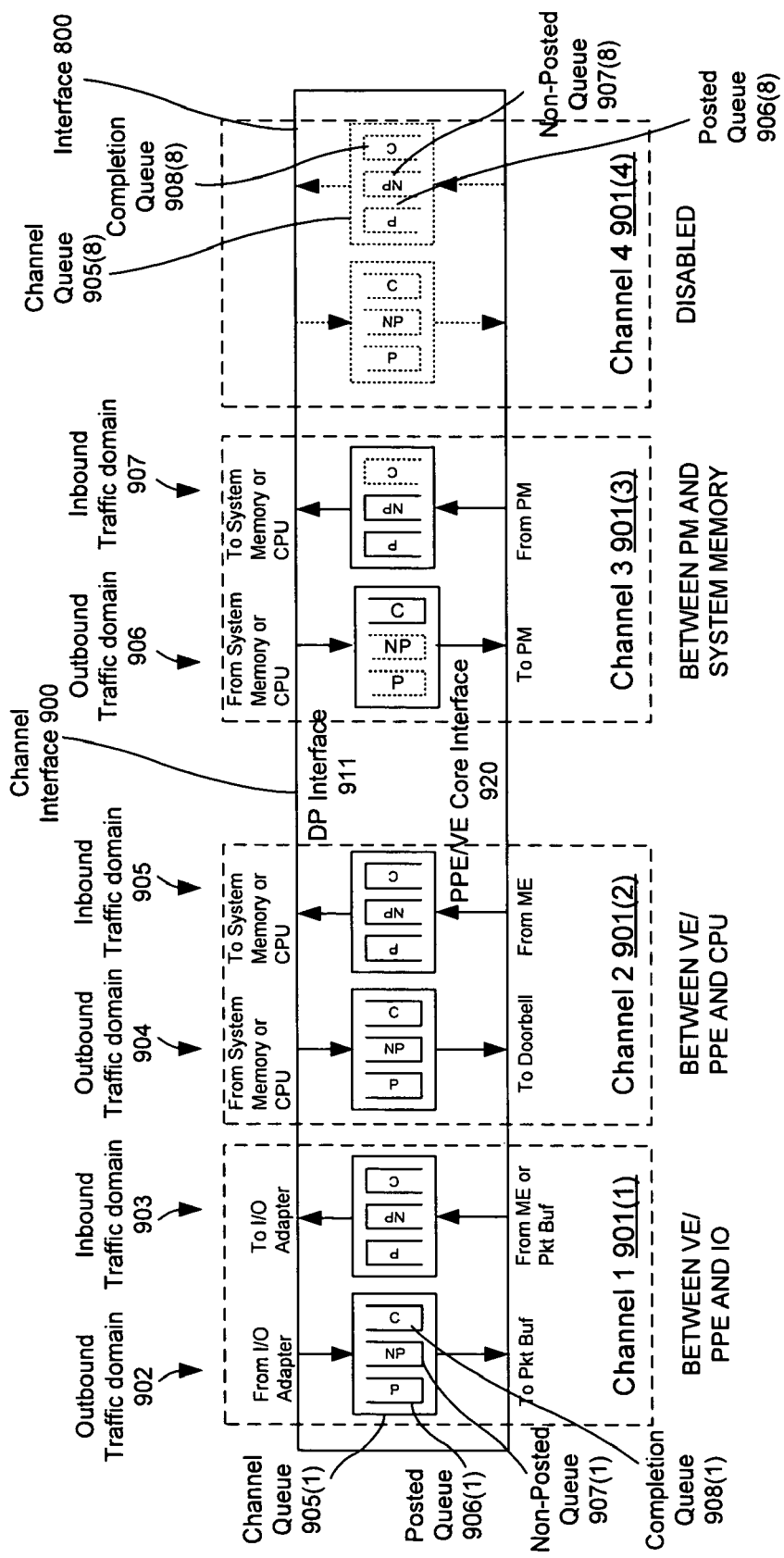
FIG. 8B illustrates the channel interface of FIG. 8A, including a plurality of traffic domains.

FIG. 8B illustrates the channel interface of FIG. 8A, including a plurality of traffic domains. Channel interface 900 is an interface between the DP interface 911 and the PPE/VE core interface 920. The DP interface 711 represents the interface to either processor and system memory 710 or peripheral device 720. In a third mode, the channel interface 900 may include three active channels (e.g., channels 901(1)-901(3)). In one embodiment, the channel interface 900 includes four physical channels, and one of the four channels is disabled, channels 901(4). Alternatively, the channel interface 900 may include more or less channels than four. Channels 901(1)-901(3) include outbound traffic domains 902, 904, and 906, respectively, and inbound traffic domains 903, 905, and 907, respectively. Each of the outbound and inbound traffic domains include a posted queue (e.g., 906(1), 906(3), and 906(5), a non-posted queue (e.g., 907(1), 907(3), and 907(5)), and a completion queue (e.g., 908(1), 908(3), and 908(5)).

The posted queue 906(1), non-posted queue 907(1), and the completion queue 908(1) of the outbound traffic domain 902 are used for transactions from the peripheral device 104 (e.g., peripheral device 720) to the packet buffer 503 of the PPE/VE 150. The posted queue 906(2), non-posted queue 907(2), and the completion queue 908(2) of the inbound traffic domain 903 are used for transactions from the packet buffers 503 of the PPE/VE 150 to the peripheral device 104 (e.g., peripheral device 720).

The posted queue 906(3), non-posted queue 907(3), and the completion queue 908(3) of the outbound traffic domain 904 are used for transactions from processor 101, or system memory 110 (e.g., processor and system memory 710) to the Doorbell Target 502(5) of the PPE/VE 150. The posted queue 906(4), non-posted queue 907(4), and the completion queue 908(4) of the inbound traffic domain 905 are used for transactions from the Doorbell Target 502(5) of the PPE/VE 150 to the processor 101, or system memory 110 (e.g., processor and system memory 710).

The posted queue 906(5), non-posted queue 907(5), and the completion queue 908(5) of the outbound traffic domain 906 are used for transactions from processor 101, or system memory 110 (e.g., processor and system memory 710) to the Private Memory (PM) target 403 of the PPE/VE 150. The posted queue 906(6), non-posted queue 807(6), and the completion queue 808(6) of the inbound traffic domain 907 are used for transactions from the PM target 403 of the PPE/VE 150 to the processor 101, or system memory 110 (e.g., processor and system memory 710).

In one exemplary embodiment, outbound and inbound traffic domains 906 and 907 are used for memory transactions between private memory 405 and system memory 110, traffic domains 902 and 903 are used for transactions between the PPE/VE 150 and the peripheral device 720, and traffic domains are used for other transactions between the PPE/VE 150 and processor and system memory 710. Alternatively, the traffic domains may be used in different combinations of dedicated interfaces.

It should be noted that the shaded entities of FIGS. 6B, 7B, and 8B are NOT needed (shown for illustration purposes only). In one exemplary embodiment for PM target related traffic, only Posted & Non Posted queues are needed for cache miss reads and cache evictions (memory writes) respectively in the outbound direction, and only a completion queue for cache read miss data is required in the inbound direction. Alternatively, other configurations may be used.

The first mode is the simplest implementation (also possibly the lowest performing one) since 'all' the traffic goes through one 'physical' channel.

Embodiments described herein may include an advantage of being capable of performing packet processing operations in the IOH hub, instead of in the processor 101, or in a peripheral device, such as the NIC. The embodiments described herein provide the ordering and transaction flow for the packet processing engine that is located within the IOH. Transaction Flow and Ordering are key towards ensuring correct operation both within the PPE/VE as well as external to the PPE/VE. As previously mentioned, the packet processing operations are normally done on a network interface card, instead of in the chipset (e.g., IOH or MCH) as described herein.

The processor(s) described herein may include one or more general-purpose processing devices such as a microprocessor or central processing unit, a controller, or the like. Alternatively, the processor may include one or more special-purpose processing devices such as a digital signal processor (DSP), an application specific integrated circuit (ASIC), a field programmable gate array (FPGA), or the like. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
a switch comprising one or more channels; and
a packet processing engine coupled to the switch, wherein the switch is operable to route packet data between one or more peripheral devices and the packet processing engine, and wherein the packet processing engine is operable to control data traffic flow and data ordering of the packet data to and from the one or more peripheral devices through the one or more channels of the switch, wherein each channel of the one or more channels comprises inbound and outbound traffic domains that each abide by ordering rules, and wherein there is no ordering rules between the traffic domains.

2. The circuit of claim 1, wherein the packet processing engine is operable to perform send and receive packet processing operations, and wherein the packet processing operations comprises at least one of virtualization of a peripheral device or Transmission Control Protocol/Internet Protocol (TCP/IP) offload.

3. The apparatus of claim 1, wherein each traffic domain comprises a posting queue for posted transactions, a non-posting queue for non-posted transactions, and a completion queue for completion transactions.

4. The apparatus of claim 1, wherein the packet processing engine comprises:
a bus interface unit coupled to the switch, wherein the bus interface unit comprises one or more channels;
a plurality of targets coupled to the bus interface unit; and
execution logic coupled to the plurality of targets, wherein the execution logic includes one or more microengines.

5. The apparatus of claim 4, wherein each inbound and outbound queue comprises a posting queue for posted transactions, a non-posting queue for non-posted transactions, and a completion queue for completion transactions.

6. The apparatus of claim 4, wherein the packet processing engine further comprises one or more packet buffers coupled to the plurality of targets.

7. The apparatus of claim 4, wherein the plurality of targets comprises at least one of:
a memory target to write context data to a data storage of the packet processing engine;
a host target to provide access to a memory space of a host system;
a lock target to provide resource arbitration and lock services;
a direct-memory-access (DMA) target to provide payload transfer services;
a doorbell target to provide access to a doorbell queue;
a messaging target to provide inter-thread messaging services;
a peripheral interface target to provide access paths to external Media Access Control (MAC) control registers;
a packet target to provide an access path from the one or more microengines to packets in the packet buffer;
a cache control block to cache private memory for the packet processing engine;
a configuration target to configure the packet processing engine; or
a cryptographic accelerator target to provide encryption and decryption services necessary to support encryption protocols.

8. The apparatus of claim 1, further comprising:
a plurality of ports coupled to the switch; and
one or more peripheral devices coupled to the plurality of ports.

9. The apparatus of claim 8, wherein the one or more peripheral device is at least one of a network interface controller, a storage interface, a video adapter, or a graphics adapter.

10. The apparatus of claim 8, further comprising:
a processor coupled to the switch; and
a memory coupled to the processor.

11. The apparatus of claim 10, wherein the plurality of ports comprises:
a cache coherent interconnect comprising a processor port coupled to the processor; and
one or more peripheral interconnects coupled to the one or more peripheral devices.

12. The apparatus of claim 11, wherein the one or more peripheral interconnects comprise a peripheral interface.

13. The apparatus of claim 10, further comprising a direct memory access (DMA) target to transfer the packet data to the memory.

14. The apparatus of claim 1, wherein the packet processing engine is a virtualization engine, wherein the virtualization engine is operable to produce an appearance of a plurality of virtual devices, and to associate a virtual device with a memory transaction.

15. The apparatus of claim 1, wherein the packet processing engine is protocol offload engine.

16. The apparatus of claim 15, wherein the protocol offload engine is Transmission Control Protocol/Internet Protocol (TCP/IP) offload engine (TOE).

17. An apparatus, comprising:
a switch comprising one or more channels;
a packet processing engine coupled to the switch, wherein the switch is operable to route packet data between one or more peripheral devices and the packet processing engine, and wherein the packet processing engine is operable to control data traffic flow and data ordering of the packet data to and from the one or more peripheral devices through the one or more channels of the switch;
a processor coupled to the switch; and
a system memory coupled to the processor, wherein the packet processing engine couples to the switch using three physical channels, the three physical channels comprising:
a first physical channel for inbound and outbound transaction flow between the packet processing engine and a peripheral device of the one or more peripheral devices;
a second physical channel for inbound and outbound transaction flow between the packet processing engine and the processor; and
a third physical channel for inbound and outbound transaction flow between private memory of the packet processing engine and the system memory.

18. A method, comprising:
providing three channels of communication, including
a first channel between the packet processing engine and a processor,
a second channel between the packet processing engine and a peripheral device, and
a third channel between the packet processing engine and a memory,
wherein each channel comprises inbound and outbound traffic domains;
routing packet data between the peripheral device, the processor, the memory, and the packet processing engine; and
controlling data traffic flow and data ordering of the packet data between the peripheral device, processor, memory, and packet processing engine using the traffic domains of the three channels of communication.

19. The method of claim 18, wherein controlling data traffic flow comprises:
receiving a data packet of a receive transaction from the peripheral device;
determining a context of the data packet, wherein the context for the received data packet includes a destination;
sending the data packet to the memory; and
notifying at least one of an application or a virtual machine monitor (VMM) of the receive transaction.

20. The method of claim 18,
wherein each traffic domain comprises a posting queue for posted transactions, a non-posing queue for non-posted transactions, and a completion queue for completion transactions.

21. An apparatus, comprising:
a packet processing engine of an input-output hub (IOH);
a peripheral device coupled to the packet processing engine by a first channel;
a processor coupled to the IOH by a second channel, wherein each of the first and second channels comprise inbound and outbound traffic domains that each abide by ordering rules; and
means for controlling data traffic flow and ordering of packet data between the peripheral device and the packet processing engine without ordering rules between the traffic domains.

22. The apparatus of claim 21, further comprising
means for accelerating communication between the processor and the peripheral device.

23. A system, comprising:
a processor;
an input-output hub (IOH) coupled to the processor, wherein the IOH comprises:
a switch; and
a packet processing engine coupled to the switch; and
one or more peripheral devices coupled to the IOH, wherein the packet processing engine is operable to control data traffic flow and ordering of packet data to and from the one or more peripheral devices, wherein the one or more peripheral devices is at least one of a network interface controller, a storage interface, a video adapter, or a graphics adapter.

24. The system of claim 23, further comprising a memory coupled to the processor.

* * * * *